US012509095B2

(12) United States Patent
Gohlke et al.

(10) Patent No.: US 12,509,095 B2
(45) Date of Patent: Dec. 30, 2025

(54) METHOD FOR OPERATING A DRIVING DYNAMICS SYSTEM FACILITY OF A MOTOR VEHICLE WHILE DRIVING WITH THE MOTOR VEHICLE, CONTROL DEVICE, AND MOTOR VEHICLE

(71) Applicants: CARIAD SE, Wolfsburg (DE); Audi AG, Ingolstadt (DE)

(72) Inventors: Franziska Gohlke, Ingolstadt (DE); Emanuel Kripp, Denkendorf (DE); Alexander Lohr, Eitensheim (DE)

(73) Assignees: CARIAD SE, Wolfsburg (DE); AUDI AG, Ingolstadt (DE)

( * ) Notice: Subject to any disclaimer, the term of this patent is extended or adjusted under 35 U.S.C. 154(b) by 248 days.

(21) Appl. No.: 18/058,187

(22) Filed: Nov. 22, 2022

(65) Prior Publication Data

US 2023/0174077 A1    Jun. 8, 2023

(30) Foreign Application Priority Data

Dec. 2, 2021   (DE) ...................... 10 2021 131 737.1

(51) Int. Cl.
*B60W 40/09*   (2012.01)
*B60W 30/182*  (2020.01)
*B60W 40/04*   (2006.01)

(52) U.S. Cl.
CPC .......... *B60W 40/09* (2013.01); *B60W 30/182* (2013.01); *B60W 40/04* (2013.01); *B60W 2540/22* (2013.01)

(58) Field of Classification Search
CPC .... B60W 40/09; B60W 30/182; B60W 40/04; B60W 2540/22; B60W 2540/221;
(Continued)

(56) References Cited

U.S. PATENT DOCUMENTS

2017/0303842 A1 * 10/2017 Yoshida ................ B60W 50/14
2018/0118219 A1 *  5/2018 Hiei ...................... B60W 50/14
(Continued)

FOREIGN PATENT DOCUMENTS

DE    102014215258 A1 *  2/2016  ............ B60W 40/08
DE    102016204901 A1     9/2017
(Continued)

*Primary Examiner* — Aniss Chad
*Assistant Examiner* — Nikki Marie M Molina
(74) *Attorney, Agent, or Firm* — Seed Intellectual Property Law Group LLP

(57) ABSTRACT

A method for operating a driving dynamics system facility of a motor vehicle includes using a control device that provides driving style data while driving, and establishes a driver type for the driver. The control device establishes a road category of a roadway. Based on the driver type and the road category, the control device establishes a current driving context, and performs a preliminary selection of at least one driving mode. Based on driver monitoring data, the control device establishes a current emotion of the driver, and selects with the aid of this one of the preselected driving modes. The control device generates a switching signal for switching to the driving mode being activated and configures accordingly the at least two motor vehicle systems. The driving mode can be adapted based on further driver monitoring data, describing a reaction of the driver to the activated driving mode.

8 Claims, 2 Drawing Sheets

(58) Field of Classification Search
CPC ..... B60W 2540/223; B60W 2540/225; B60W 2540/30; B60W 2552/00; B60W 2552/05; B60W 50/082; B60W 40/02; B60R 16/037
See application file for complete search history.

(56) References Cited

U.S. PATENT DOCUMENTS

2019/0126914 A1* 5/2019 Nojoumian .......... G05D 1/0088
2020/0307611 A1* 10/2020 Goto ................. B60W 60/0016
2021/0039663 A1* 2/2021 Gohlke ................. B60W 50/10

FOREIGN PATENT DOCUMENTS

| DE | 102018001342 A1 | 9/2018 |
| --- | --- | --- |
| DE | 102019003557 A1 | 1/2020 |
| DE | 102019200597 A1 | 4/2020 |
| DE | 102019202230 A1 | 8/2020 |
| DE | 102019118184 A1 | 1/2021 |

* cited by examiner

METHOD FOR OPERATING A DRIVING DYNAMICS SYSTEM FACILITY OF A MOTOR VEHICLE WHILE DRIVING WITH THE MOTOR VEHICLE, CONTROL DEVICE, AND MOTOR VEHICLE

BACKGROUND

Technical Field

Embodiments of the invention relate to a method for operating a driving dynamics system facility of a motor vehicle while driving with the motor vehicle.

Description of the Related Art

By a driving dynamics system facility is meant a device, a component of a device, or a group of devices which are adapted to set, i.e., activate, different driving modes. Each driving mode describes settings specific to the driving mode for a set of at least two motor vehicle systems, i.e., configurations specific to the driving mode. In each driving mode, the at least two motor vehicle systems, or the totality of motor vehicle systems, can be set centrally through the driving dynamics system facility. The motor vehicle systems include a steering system, in which a steering torque can be variably adjusted; a dynamic steering, in which a steering ratio can be variably adjusted; a gas pedal and/or engine system, in which a variable characteristic can be specified; a headlight system, in which for example a variable swivel behavior of the cornering light can be adjusted and/or an automatic transmission, in which a shifting program can be adjusted specific to the driving mode. Further possible motor vehicle systems are a system for setting a sporty differential with a variable transverse distribution, a shock absorber system, in which the damping characteristics can be variably adjusted, a system for control of the interior lighting and/or music output to adjust the ambience in the interior, and a variable triggering program.

Different driving profiles are present in the motor vehicle (such as "comfort," "offroad," "efficiency"), placing the systems in an attribute attuned to the particular mode and thus creating a corresponding overall vehicle characteristic. These different profiles are activated manually by the driver, for example via a button and via a touch control in the center display.

In order to activate a specific driving profile, the driver must undertake a manual switching, which involves an increased mental workload, since the driver for example has to search for the button to set the driving profile on a touch display. In addition to that, a system understanding in regard to the driving profile characteristics is necessary in order to select the optionally available driving profile based on the vehicle/driver/environment situation.

DE 10 2019 200 597 A1 describes a method for adapting a driving mode of a vehicle to the emotional state of the driver.

From DE 10 2018 001 342 A1 there is known a driver assist system comprising one or more processors, which are configured to execute a general driver model learning program, which is configured to produce a general driver model to be applied to a plurality of vehicle drivers based on driving data from the plurality of drivers, and to execute an individual driver model learning program, which is configured to produce an individual driver model, which is unique to a specific vehicle driver, based on driving data of the specific driver, and containing an onboard controller, which is provided in a vehicle and activated by the specific driver.

DE 10 2016 204 901 A1 describes a method for situational adaptation of driver parameters of a driving profile for a motor vehicle.

BRIEF SUMMARY

Some embodiments provide a more precise configuring of the motor vehicle to the personal needs of the driver.

Some embodiments are based on the idea of performing a context analysis during driving, in which a road category of a current roadway of the motor vehicle is ascertained and a driving behavior is analyzed, in combination with an emotional analysis of the driver, in order to select a driving mode specific to the situation and the driver from a plurality of driving modes, and to switch to this preselected driving mode. A weighting of factors is performed, during which driver-specific qualities such as the driver's driving style and his current emotion are taken into account, along with the surroundings. The driving mode selected on the basis of this analysis then configures at least two motor vehicle systems. Thus, for example, for a sporty driver type it is possible to select and activate a dynamic program as the driving profile or driving mode, as long as this sporty dynamic program is appropriate to the situation, that is, as long as the motor vehicle is already traveling on a road on which sporty driving is possible. Unlike the establishing of a driving mode based on a road condition, the driving mode is found based on the road category and the emotion of the driver. Thus, for example, a dynamic driving program can be advisable in particular on a freeway, as long as the driver is a "sporty type." This dynamic program can then be adapted for example to the conditions and possibilities of a "main road" or a "country road" upon leaving the freeway.

This switching based on context analysis and emotion analysis creates the basis for a constant reevaluation, so that the driving profile can change while driving and it is also optimally adapted to the situation and the driver. This principle is combined with a learning algorithm, which investigates the reaction of the driver to the newly established driving mode, and the analysis and evaluation method will be adapted if necessary.

In other words, the profile which is optimally experienced individually for the driver is automatically activated by means of a comprehensive analysis. The workload, i.e., the necessary involvement of the driver in the switching to a driving profile and the effort of understanding the technical circumstances, is reduced for the driver and the experiencing of the driving profile is always optimized in all vehicle/driver/environment situations. The learning algorithm, which allows a profile activation to occur individually for the driver with his present mood, in addition to the automatic profile switching, in terms of the preferences and emotions of the driver, ensures that the analysis and evaluation method will select the driving mode always more appropriately over the course of time.

The automatic and intelligent switching makes possible an optimally experienced driving profile. The optimally experienced driving profile enables a full experiencing of the spectrum of the vehicle characteristics, without requiring a system understanding on the part of the driver. Manual operation by the driver is thus obsolete, thereby making a significant contribution to the reducing of distraction and consequently also the reducing of the mental workload.

The method according to some embodiments for operating the driving dynamics system facility of the motor vehicle is carried out by a control device during the driving of the motor vehicle. By a control device is meant an apparatus, a component of an apparatus, or a group of apparatus which is designed to receive and evaluate signals and generate control signals. The control device can be configured for example as the controller of the motor vehicle, as a computer program, or as an assemblage of multiple controllers which are interconnected for data fusion.

The control device provides driving style data, the driving style data describing a driving style of the driver of the motor vehicle. The driving style data can describe the current and/or the long-term driving behavior of the driver. For example, the driving style data can describe a steering behavior of the driver, i.e., the steering movements which he or she makes while driving. Alternatively or additionally, the driving style data can describe an acceleration and braking behavior of the driver, i.e., the corresponding longitudinal control initiated by the driver. Furthermore, driving style data may optionally describe conditions of the individual vehicle functions and vehicle systems of the motor vehicle, for example, the driver has adjusted them during a manual operation. The driving style data can thus describe, for example, how the driver grasps the steering wheel, how he or she accelerates and/or brakes, for example whether he or she brakes smoothly or abruptly, and which assist systems he or she utilizes. With the aid of the driving style data provided, the control device establishes a driver type for the driver. Thus, the driver can be, for example, a sporty driver type, a relaxed driver type, or even a family man or family woman.

The control device establishes a road category of a roadway on which the motor vehicle is traveling. In other words, the control device ascertains the kind of road on which the motor vehicle is located, i.e., whether the motor vehicle is on a country road, traveling on the freeway, or traveling in town. Thus, it does not take account of the condition of the road, but instead the category of the road, which indicates for example what is and what is not possible on this road in terms of speed or lane width. Thus, for example, a sporty mode can be more suited to a freeway than a road not associated with a category of highways, such as a road within a closed locality.

The driving style data can be received by the control device from the motor vehicle sensors, for example, and information on the road category from a navigation device, for example. Accordingly, the motor vehicle can comprise a sensor device, i.e., an apparatus, a group of apparatus, or a component of an apparatus which is adapted and designed to detect the driving style data with the aid of at least one sensor. For the detecting of the driving style data, the sensor device comprises customary sensors for the detecting of the braking behavior and steering behavior, for example.

The control device uses the established driver type and the established road category to determine a current driving context. The combination of a sporty driver and a freeway as the roadway can mean, for example, the driving context of "sporty or dynamic long-distance travel." A rather relaxed driver type, who is just driving around town, may form for example the driving context of "relaxed short-distance travel."

In a preliminary selection from a plurality of predetermined driving modes, for example from the available driving modes of comfort, dynamic, and offroad, the control device selects at least one driving mode, such as at least two driving modes, which are associated with the established driving context. For example, the driving modes "dynamic" and "auto" may be associated with the driving context of "sporty long-distance travel." For example, the driving modes "comfort" and "efficiency" (i.e., an energy-saving driving mode) may be associated with the driving context of "cautious city driving."

Each of the driving modes describes respectively a set of settings, specific to the driving mode, for at least two motor vehicle systems of the motor vehicle. Thus, for example, the driving mode "dynamic" may be associated with transmission settings so that the motor vehicle accelerates very fast and upshifts late. Thus, the driving mode "dynamic" can be a sporty mode, while an "auto" mode can be a well-balanced mode with system settings which experience shows are pleasing to the majority of drivers, for example. A "comfort" mode can be associated for example with a muted interior lighting, optionally quiet music, and settings for the least possible background noise for a pleasant interior ambience, as well as safety-conscious transmission settings. A sporty driver, for example, on a road which cannot be assigned to any category of highway or road within a locality may be assigned a driving mode in which a damping is adapted to possible irregularities in particular.

The control device provides driver monitoring data describing a current state of the driver. Using the provided driver monitoring data, the control device determines a current emotion of the driver. The driver monitoring data can be received by the control device for example through capacitive sensors and/or pressure sensors in the steering wheel, for example sweat sensors in the steering wheel. Alternatively or additionally, this can be done by an evaluation of camera images of a driver observation camera in regard to facial expressions and/or bodily movements of the driver, and/or the posture of the driver, and/or eye movements. The driver monitoring data can optionally describe a quality of the voice of the driver, for which microphones of the sensor device can register the speech of the driver, for example. In addition or alternatively, the driver monitoring data can describe vital data of the driver, for example, such as data on the heart rate and/or skin conductivity and/or other physiological parameters which can be registered by the sensors of the motor vehicle, or which can be received for example from a mobile terminal device, such as a wearable or a smartphone.

Ideally, for the preliminary selection, at first one or more driving modes are selected with the aid of the driver type, and this selection is then further refined based on the ascertained road category.

With the aid of the emotions so determined, the control device selects one of the preselected driving modes as the driving mode to be activated, the driving mode to be activated being matched up with the emotions so determined. For example, if in the preliminary selection the driving modes "comfort" and "dynamic" are chosen, but on account of hectic eye movements and a high sweating rate the control device deduces the emotion of "stress," the driving mode to be activated may be "comfort," for example. If the emotion so determined is "good mood" or "playful," for example, the control device may instead select the driving mode "dynamic" as the driving mode to be activated.

The control device generates a switching signal describing a switch from the current driving mode to the driving mode being activated with the respective associated settings of the at least two motor vehicle systems, and transmits the generated switching signal to the driving dynamics system facility of the motor vehicle, which then configures the at least two motor vehicle systems accordingly.

The already mentioned benefits will result. Thanks to the preliminary selection, a weighting is done, so that the driver type and the road category have a larger weighting than the emotions of the driver in the final choice of the driving mode to be activated. For example, if the preliminary selection contains two driving modes, in which a first choice is made with the aid of the driver type, and then with the aid of the road category, this weighting will be even stronger on the part of the established driver type.

The control device after the configuration of the at least two motor vehicle systems provides further driver monitor data, and ascertains with the aid of these further driver monitor data whether the described driving behavior fulfills a given acceptance criterion, which states that the ascertained emotion or a reaction of the driver described by the provided further driver monitor data is a given positive emotion or reaction. If the driving behavior does not fulfill the given acceptance criterion, the control device assigns a different driving mode to the emotion ascertained with the aid of the first driver monitoring data.

Thus, for example, if the control device determines, after setting the driving mode, that the driver is laughing and relaxed, and it determines for example through the microphones and a speech analysis that the driver is speaking positively about the driving experience in the established driving mode, this can be evaluated as a positive emotion. On the other hand, if the control device determines, after setting the driving situation to be activated, that the driver is uneasy, has hectic eye movements, even though driving on a deserted country road, and his heart rate increases, for example, the control device in this embodiment can determine for example that the driver is feeling stress, and in this example "stress" cannot be characterized as a positive emotion.

Thus, for example, if the driver does not feel at ease in the settings of the driving mode "dynamic" on a deserted country road, the control device in which the given acceptance criterion is not fulfilled can change the driving mode to "comfort," for example. A reevaluation can be done once more, and the control device can determine for example that the driver is now more satisfied. Thus, the control device can "learn" how the driver responds to its choice, and adapt if necessary. In particular in the case of a new purchase, when the control device has not yet "come to know" the driver, or if the driver lies perhaps between two classical driver types, a fine tuning of the driving mode selection may be done. Thus, the driving mode selection becomes ever more precise and specific to the driver. If the driver has newly purchased the motor vehicle, for example, or if he or she sells his motor vehicle, the "intelligence" of the control device, i.e., the dynamics of the driving mode switching, can evolve along with the driver.

In one embodiment of a method, the control device can additionally provide driving situation data describing a current driving situation, the driving situation data describing an occurrence of an influence independent of the motor vehicle on the driving behavior of the motor vehicle and/or the driver.

An occurrence of an influence independent of the motor vehicle can be: an incoming telephone call; an upcoming traffic situation, in which the motor vehicle drives on a ramp onto a traffic lane of a road; a kick-down situation; a downshifting to a lower gear manually produced or being produced by the driver, i.e., a manual intervention by the driver; falling below a given value of a still available fuel reserve, i.e., if a present state of charge falls below a threshold value, or the fuel tank level falls below a threshold value; or driving on an unpaved road; or a passing maneuver initiated by the driver.

The control device can verify in this embodiment whether the current driving situation fulfills a given prioritizing criterion, describing a predetermined need to activate a prioritizing driving mode associated with the occurrence. The control device can then generate a second switching signal and transmit this to the driving dynamics system facility, describing a switch to the prioritizing driving mode.

The checking for the given prioritizing criterion is thus a checking for situations in which a particular driving mode is prioritized with respect to the context and emotion analysis. For example, if the tank is almost empty, an "efficiency" mode can be switched on, without regard to the driving style data or the environment data, so that the motor vehicle runs as economically as possible and thus the likelihood of the driver reaching a gas station is increased. The switching to the prioritizing driving mode may last only as long as is necessary, i.e., only as long as the tank is empty, for example. A constant reevaluation can be done, that is, a check can be done at regular intervals, for example when the road category changes, to see whether such a prioritizing situation is still present. Such prioritizing factors like the fill level of the tank, the incoming telephone call, or one of the other given prioritizing situations thus take precedence.

Alternatively or additionally, the driving situation data may also be, for example, an attribute and/or an occurrence in the current environment of the motor vehicle, such as weather data, data on the traffic flow and/or a traffic jam, and/or the present course of the road. The driving situation data in one of these variants can also be called environment data. For the detecting of such environment data, the sensor device can have a communication module for receiving radio traffic reports, and/or customary sensors, such as sensors for radio-based and/or optical range finding, such as a radar and/or a lidar. Other suitable sensors are cameras, for example.

Further optional environment data can be environment data describing the current traffic in the vicinity of the motor vehicle. Alternatively, the environment data can also determine for example the number of motor vehicles in the given vicinity of the ego motor vehicle. Thus, the control device uses the environment data provided to determine the current traffic in the vicinity, and selects the driving mode to be activated from the preselected driving modes also based on the traffic so determined. Here as well, the choice of the driving mode is even more precise and much more specific to the situation.

For example, if the sensors fail and no secondary factors, such as the traffic flow, can be registered, the evaluation will be done only based on the primary factors, i.e., the driver type, road category and emotion. The special cases for the optional priority situations will still exist.

A first of the at least two motor vehicle systems can be a drive control of the motor vehicle, and another motor vehicle system can be a system for control of the steering, an interior lighting, or a system involving the ambience in the motor vehicle. The respective driving mode may specify settings for at least three motor vehicle systems.

Some embodiments include the control device for the motor vehicle. The control device may comprise a data processing device or a processor facility, which is designed to carry out an embodiment of the method described herein. For this, the processor facility may comprise at least one microprocessor and/or at least one microcontroller and/or at least one FPGA (Field Programmable Gate Array) and/or at least one DSP (Digital Signal Processor). Furthermore, the processor facility can have a program code which is designed to implement the embodiment of the method described herein through the processor facility. The program code can be stored in a data storage of the processor facility.

The motor vehicle described herein may be configured as an automobile, especially a car or truck, or as a passenger bus or motorcycle. The motor vehicle described herein comprises an embodiment of the control device described herein.

Some embodiments include modifications of the motor vehicle described herein and the control device described herein having features as have already been described in connection with the modifications of the method described herein. For this reason, the corresponding modifications of the motor vehicle described herein and the control device described herein will not be further described here.

Some embodiments encompass combinations of the features of the described embodiments. Thus, some embodiments encompass realizations having a combination of the features of several of the described embodiments, as long as the embodiments have not been described as being mutually exclusive.

BRIEF DESCRIPTION OF THE SEVERAL VIEWS OF THE DRAWINGS

In the following, embodiments of the invention shall be described.

DETAILED DESCRIPTION

In the embodiments described herein, the components described for the embodiments each time represent individual features, to be viewed independently of each other, which also modify embodiments each time independently of each other. Therefore, the disclosure will also encompass other than the presented combinations of features of the embodiments. Moreover, the described embodiments can also be amplified with other features already described.

In the figures, the same reference numbers apply each time to functionally identical elements.

Figure 1:
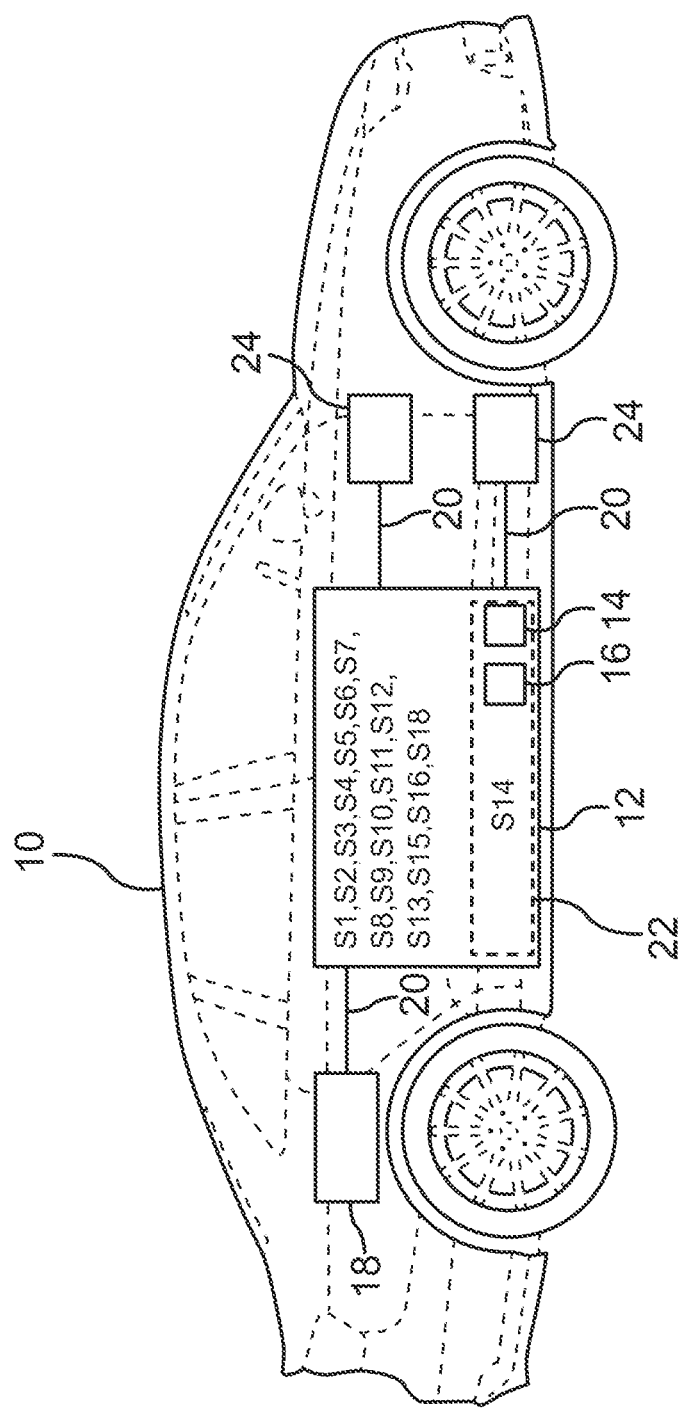
FIG. 1 shows a schematic representation for a first embodiment of a method and devices.

FIG. 1 illustrates the principle of the devices described herein, as well as the method described herein. For this, FIG. 1 shows a motor vehicle 10, such as a car.

The control device 12 can be configured as a controller, for example, or as a control chip, for example. The control device 12 of the example in FIG. 1 can have a data storage 14, and a processor facility 16, i.e., one or more microchips or one or more microprocessors. The data communication of the control device 12 with a sensor device 18 can occur for example through wireless or wireline data communication connections 20.

FIG. 1 shows schematically the sensor device 18, which can comprise a multitude of sensors for detecting the driving style data and the environment data. Moreover, the sensor device 18 comprises at least one sensor for detecting the driver monitoring data. Optional driving situation data can be provided for example by the onboard computer and by sensors or techniques known to the person skilled in the art, such as those for determining an incoming telephone call, the gas tank level, or the state of charge of a battery. The environment data, which can optionally describe the condition of the roadway, can be detected for example through cameras of the motor vehicle and an image analysis, or for example by retrieving current warning messages about poor road conditions or a rain-slick roadway. Environment data for determining the traffic flow may be, for example, data from a server external to the motor vehicle, describing for example a traffic jam, or data from other motor vehicles gathered through near field communication. Alternatively, sensors for radio-based and/or optical range finding can be used, for example radar and/or lidar, to determine the traffic flow.

For reasons of better comprehension, the individual sensors are not shown in FIG. 1. The sensors may comprise capacitive sensors or pressure sensors arranged for example in the steering wheel, in order to monitor the steering driving behavior. A driver observation camera in the interior of the motor vehicle may be directed for example at the face and/or the body, in order to register for example the facial expression or posture. Optionally, the sensor device 18 can have one or more microphones, by which the speech can be recorded, and a speech recognition software and/or voice analysis software can then analyze the voice and/or speech, for example.

The control device 12 in step S1 of the method provides the driving style data describing the driving style of the driver. For example, the control device 12 can use the steering behavior to determine (S2) that the driver is a sporty type.

For the providing of the environment data (S3), the control device 12 can receive the corresponding data for example from the respective sensors, such as camera data describing the road films, or map data describing the road category. The control device can thus ascertain in S4 that the motor vehicle is on a freeway, for example. As the driving context, it can determine for example the context of "dynamic long-distance travel" (S5).

The following input data, either alone or in any given combinations, can be used for this context analysis: the current and/or long-term driving behavior; whether other passengers are present in the motor vehicle 10 and if so which ones; operating action(s) performed in the interior of the vehicle, such as adjusting the interior light and music; conditions of the individual vehicle functions and systems (such as state of charge, gas tank level, driver assist systems activated, error conditions of systems, functions of components); a danger situation (country road, entering a freeway, city, construction site); the traffic flow (open road, traffic jam, slow traffic); and/or upcoming road data (road conditions, friction values). For the optional determination of the present traffic flow (S7), the control device can also optionally listen to and evaluate a traffic radio.

In a preliminary selection S8, for example during dynamic freeway driving, the driving modes "dynamic" and "auto" can be selected.

The emotional mood of the driver will come into play after the preliminary selection through the driver monitoring data. The driver monitoring data provided in S9 can make possible in the evaluation S10 for example the emotions "enthusiasm" as an analysis of the current emotions of the driver. The driver monitoring data can describe for example a heart rate, a skin conductivity, a facial expression, an eye movement, or a quality of the voice. Suitable sensors are known to the person skilled in the art from the prior art. If, for example, the control device 12 determines "overtaxed" instead of "enthusiasm," it can select the "auto" driving mode instead of the "dynamic" profile (S11).

Depending on the emotion, the control device 12 thus generates in S12 a switching signal, which in the example describes either the "dynamic driving mode" or the "auto driving mode" (S12), and transmits the generated switching signal to the driving dynamics system facility 22, which in the example of FIG. 1 can be a component of the control device 12 (S13). Alternatively, the driving dynamics system facility 22 can be a component structurally separate from the control device 12, and it can communicate with the control device 12 via a data communication connection 20.

The particular settings for at least two motor vehicle systems 24, such as more than two, can then be saved in the driving dynamics system facility 22 for each driving mode, and the driving dynamics system facility 22 can control the motor vehicle systems 24, such as a transmission and an interior lighting, in accordance with the switching signal of the control device 12 (S14).

The learning process of the control device 12 to "familiarize itself" with the driver is especially advantageous, for example, when the driver has newly purchased the motor vehicle, or a categorization as a driver type is not yet definite. For example, after switching to the "dynamic" driving mode on the freeway it may be determined (S15) that the driver is apparently not happy with the choice of the driving mode, and thus the given acceptance criterion is not fulfilled. In the example, the driving mode "auto" can then be activated instead of the driving mode "dynamic" and yet another check can be done (S15) to see whether the driver now seems satisfied. If this is the case, the driving mode "auto" can be matched up with the emotion of the driver prior to switching to "dynamic" (S16). Optionally, the learning algorithm can provide that a manual selection of a different driving mode by the driver is taken into account in a particular situation, such as based on whether this manual selection is made often and repeatedly at the same location. This can be determined, for example, by means of geofencing.

In the case of the optional inclusion of a prior checking for prioritized driving situations when providing the driving situation data (S17), it can be determined for example that the gas tank level has fallen below a given threshold value. The given prioritizing criterion can be stored for example in the data storage 14 and the check S18 can reveal that the given prioritizing criterion is fulfilled. The control device 12 can generate a second switching signal (S12) and transmit this to the driving dynamics system facility 22 (S13), which can describe for example a switch to the prioritizing driving mode "energy saving" ("efficiency"). The motor vehicle 10 then moves in energy saving manner, such as until the motor vehicle finds itself on an acceleration lane of a freeway, or until the gas tank has been refilled, for example.

Figure 2:
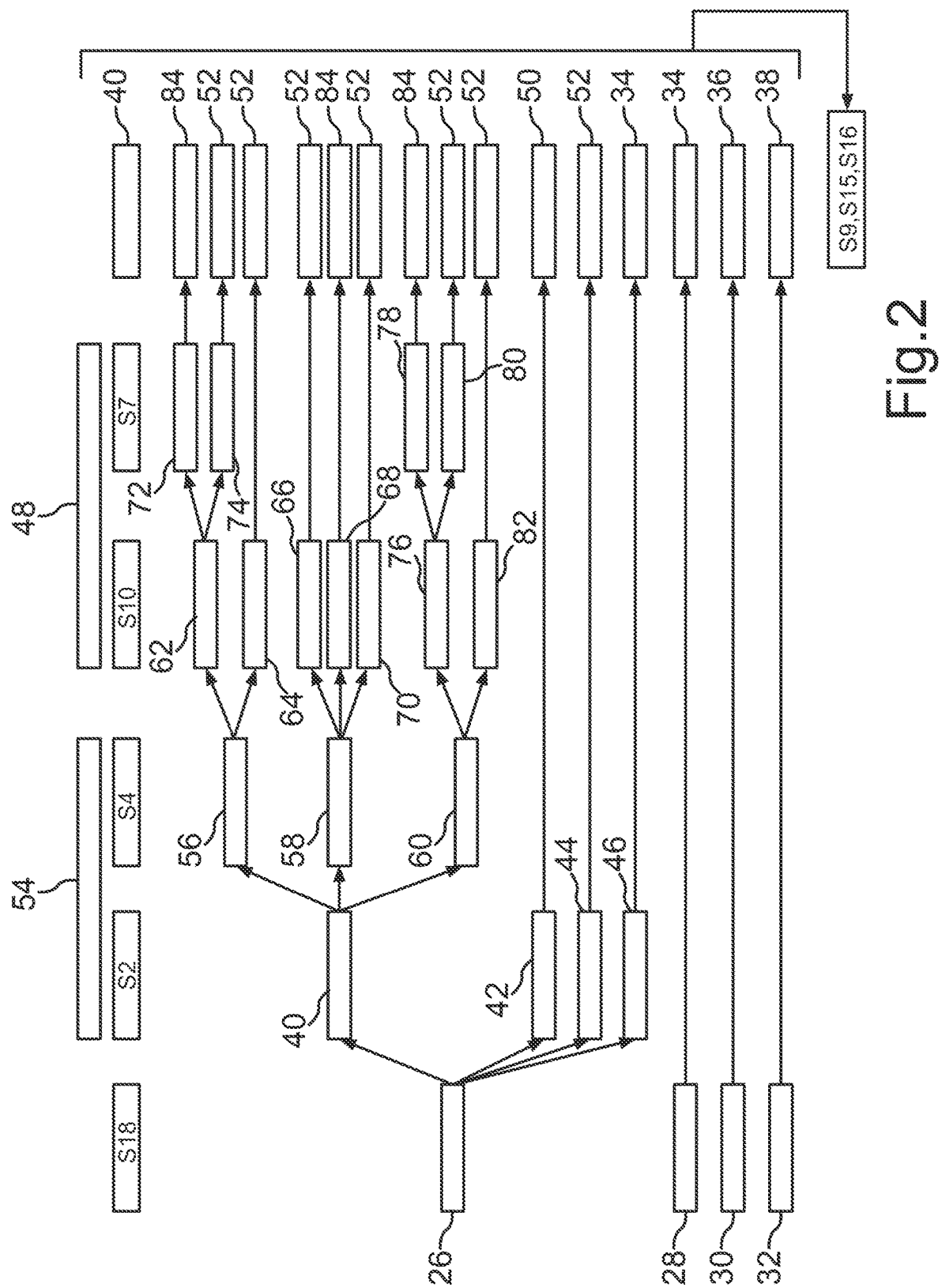
FIG. 2 shows a schematic representation for a further embodiment of a method.

FIG. 2 shows an example of the logic for an initial parametrization as a further embodiment of the method described herein.

The optional checking S18 as to whether a given prioritizing criterion is fulfilled (column S18) can be divided into the option that no priority situation is present (26) or that the given prioritizing criterion is fulfilled (28, 30, 32). A first priority situation 28 can be, for example, that the tank is empty, a second one can be an "offroad" situation 30, or an alternative priority situation 32 in which a telephone call can arrive while driving. Each of these priority situations 28, 30, 32 can select a different driving mode 34 to be activated, for example an energy saving driving mode, an "allroad driving mode" 36 or an alternative driving mode 38 (column 40 as the column for the result of the driving profile).

If no priority situation exists, i.e., the given prioritizing criterion is not fulfilled (26), or if the optional checking procedure S18 is not done, the driver type of the driver can be established at first (column S2). Possible driver types are, for example, the sporty type (40), the "undefined" type (44), i.e., a type which cannot be assigned to any of the usual categories, if the control device 12 has not yet familiarized itself with the driver, for example; or the "efficient" type (46), i.e., a driver type who likes to drive economically.

A driving mode can be assigned to the types 42, 44, 46 directly, without establishing the road category (column S4) and without optional evaluation of secondary factors 48. For example, a driving mode "comfort" 50 can be assigned to the "comfortable" type 42, the driving mode "auto" (52) to the "undefined" type, and the driving mode "efficiency" (34) to the "efficient" type.

The further selection is then done with the aid of the ascertained emotion. Examples of this have already been mentioned above.

The evaluation of the secondary factors can involve a determination of the traffic flow (S7). The secondary factors 48 come after the primary factors 54, which include the determining of the driver type S2 and the determining of the road category S4.

When determining the road category S4, it is possible to determine the category of freeway (56), the category of country road (58), or the category of city (60), for example.

For example, the emotion of the driver can be ascertained by means of the vehicle sensors (S10). The different emotions 62, 64, 66, 68, 70, 76, 82 may influence the choice of the driving mode in different ways. Thus, for example, depending on whether the emotion is "happy" (62) or "normal" (64), the driving modes "dynamic" (84) or "auto" (52) will be used in the narrower selection, or only the driving mode "auto" (52).

Optionally, a road condition can be additionally determined (S4) and taken into account (S6). Possible optional road conditions can be "good" or "bad," "good (straight)" or "good (winding)" or Possible optional traffic flows can be: "open" (72) or "slow/traffic jam" (74) or, for the road category "city" (60) and the optional road condition "good," the traffic flow can be "open" (78) or "slow/traffic jam" (80). For an optional bad road condition for roads in the city—or only for roads in the city—the driving mode "auto" (52) can be assigned directly, for example. The driving mode "auto" (52) can be assigned to different combinations of primary factors and secondary factors, as shown for example in FIG. 2. However, a driving mode "dynamic" (84) can be assigned for example to an open freeway, if the driver type is a sporty type; and optionally if the road condition is good, in addition. "Dynamic" can also be assigned as the driving mode 84 for the example of a winding country road of the sporty driver type, optionally only when the road condition is good or for open and good roads in the city.

Ideally, in the example of FIG. 2, the learning function comes afterwards with the steps S9, S15 and S16. For example, a switching can be done from "dynamic" to "comfort" if the driver is not satisfied with the proposal of "dynamic," which can be deduced for example from agitated gestures of the driver or a typical facial expression indicating lack of satisfaction.

On the whole, the examples show how an automatic driving profile switching can be done on the basis of an empathic and optionally self-learning, as well as forward-looking algorithm.

In a further embodiment, in order to reduce the workload and constantly optimize the experience of the driving profiles in all vehicle/driver/environment situations, the optimally experienced profile for the individual driver is automatically activated by means of a comprehensive analysis. A self-learning algorithm with regard to the preferences and emotions of the driver can make possible a profile activation individually for the driver with his present mood, in addition to the automatic profile switching.

In another technical implementation, for the determination of the optimally suited driving profile at first the driving style of the driver is classified and matched up with one or more suitable driving profiles (such as drive select) (S2, S8). Since the driving mode must always be attuned to the present environment and driving situation, various data on the road category (e.g., country road/freeway/city), the traffic flow, and optionally the road condition are then taken into account (S4, S8). Both metered values from the motor vehicle 10 and backend data can be used for this.

Example input data for the analysis are:
the current and long-term driving behavior, and/or
other passengers in the vehicle, and/or
operating actions performed in the interior of the vehicle, and/or
the emotional mood of the driver, and/or
conditions of the individual vehicle functions and systems (e.g., state of charge, gas tank level, driver assist systems activated, error conditions of systems, functions and components), and/or
the driving situation (country road, freeway driving, city, construction site), and/or
the traffic flow (open road, traffic jam, slow traffic), and/or
upcoming road data (road conditions, friction values).

The ideal driving mode determined from these data can be overruled by so-called priority factors. These priority factors may involve various occurrences:
incoming telephone call, and/or
merging into fast-moving traffic (such as driving onto a freeway), and/or
kick down, and/or
manual downshifting, and/or
fuel reserves, and/or
unpaved road, and/or
passing maneuver, Whereupon the mode can be selected accordingly with the most suitable configuration for the situation (S18).

In order to further explore the personal taste of the user, overruling by the driver can be processed in a self-learning algorithm. For example, if the driver in a certain situation repeatedly selects a different mode than that from the function, the user's wishes can be selected directly by the algorithm in future in comparable situations and/or at the same locations (for example, through geofencing).

In a further step, the emotional response of the user to a change of driving profile can be classified and used in order to adapt the algorithm more precisely to the personal taste of the driver.

Through analysis of the physiological parameters, the emotion of the driver can be detected. The following physiological parameters can be analyzed for this:
heart rate, and/or
skin conductivity, and/or
facial expression, and/or
eye movements, and/or
voice.

A switching of the driving modes is done based on a context analysis (driving behavior and environment data) and emotion analysis (for example, facial expression and/or speech).

The automatic and intelligent switching to an optimally experienced driving profile makes it possible to experience the full spectrum of vehicle characteristics, without the driver needing to have an understanding of the system. Manual operation by the driver is thus obsolete, thereby making a significant contribution to the reducing of visual distraction and consequently also the reducing of the mental workload.

German patent application no. 10 2021 131737.1, filed Dec. 2, 2021, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a driving dynamics system facility of a motor vehicle while driving with the motor vehicle, comprising:
providing, by a control device, driving style data while driving, describing a driving style of a driver of the motor vehicle and establishing a driver type for the driver based on the driving style data,
establishing, by the control device, a road category of a roadway on which the motor vehicle is driving,
based on the driver type and the road category, establishing, by the control device, a current driving context in a context analysis,
in a preliminary selection, based on the context analysis: selecting, by the control device, at least two predetermined driving modes associated with the current driving context from a plurality of predetermined driving modes, each of the predetermined driving modes describing a set of settings that is specific for at least two motor vehicle systems of the motor vehicle,
providing, by the control device, driver monitoring data, describing a current condition of the driver, and determining, by the control device based on the driver monitoring data, a current emotion of the driver in an emotion analysis,
based on the current emotion and the emotion analysis, selecting, by the control device, a first one of the at least two predetermined driving modes associated with the current driving context as a driving mode to be activated, the driving mode to be activated being matched up with the current emotion,
generating a first switching signal, by the control device, which describes switching to the driving mode being activated with the set of settings that is specific for the at least two motor vehicle systems described by the first one of the at least two predetermined driving modes associated with the current driving context selected to be activated, and transmitting, by the control device, the first switching signal to the driving dynamics system facility for configuring the at least two motor vehicle systems,
after configuration of the at least two motor vehicle systems, providing, by the control device, further driver monitoring data, determining, by the control device, whether a driving behavior described based on the further driver monitoring data fulfills a given acceptance criterion that specifies that the current emotion or a reaction of the driver described by the further driver monitoring data, being an operating of the motor vehicle, is a given positive emotion or reaction, and when the driving behavior does not fulfill the given acceptance criterion: selecting, by the control device, a second one of the at least two predetermined driving modes associated with the current driving context using an emotion determined based on the further driver monitoring data and generating a second switching signal that describes switching to the second one of the at least two predetermined driving modes associated with the current driving context with the set of settings that is specific for the for at least two motor vehicle systems described by the second one of the at least two predetermined driving modes associated with the current driving context.

2. The method according to claim 1, wherein the control device:

provides driving situation data describing a current driving situation, wherein the driving situation data describe an occurrence of an influence independent of the motor vehicle on the driving behavior of the motor vehicle and/or the driver, determines whether the current driving situation fulfills a given prioritizing criterion, describing a predetermined need to activate a prioritizing driving mode associated with the occurrence, and generates a second switching signal and transmits this to the driving dynamics system facility, describing a switch to the prioritizing driving mode.

3. The method according to claim 2, wherein the occurrence of the influence independent of the motor vehicle on the driving behavior of the motor vehicle and/or the driver is: an incoming telephone call; an upcoming traffic situation, in which the motor vehicle drives on a ramp onto a traffic lane of a road; a kick-down situation; a downshifting manually produced by the driver; falling below a given value of a still available fuel reserve; driving on an unpaved road; or a passing maneuver.

4. The method according to claim 2, wherein the control device:

uses the driving situation data provided to determine a current traffic occurrence in a vicinity of the motor vehicle, and selects the driving mode to be activated based on the current emotion, the emotion analysis, and the current traffic occurrence.

5. The method according to claim 1, wherein a first of the at least two motor vehicle systems is a drive control of the motor vehicle, and wherein another motor vehicle system is a system for control of steering, an interior lighting, or a system involving ambience in the motor vehicle.

6. The method according to claim 5, wherein the driving modes specify settings for at least three motor vehicle systems.

7. A control device for operating a driving dynamics system facility of a motor vehicle while driving with the motor vehicle, the control device comprising:

at least one processor; and a data storage storing program code that, when executed by the at least one processor, causes the control device to:

provide driving style data while driving, describing a driving style of a driver of the motor vehicle and establish a driver type for the driver based on the driving style data, establish a road category of a roadway on which the motor vehicle is driving, based on the driver type and the road category, establish a current driving context in a context analysis, in a preliminary selection, based on the context analysis: select at least two predetermined driving modes associated with the current driving context from a plurality of predetermined driving modes, each of the predetermined driving modes describing a set of settings that is specific for at least two motor vehicle systems of the motor vehicle, provide driver monitoring data, describing a current condition of the driver, and determine based on the driver monitoring data, a current emotion of the driver in an emotion analysis, based on the current emotion and the emotion analysis, select one of the at least two predetermined driving modes associated with the current driving context as a driving mode to be activated, the driving mode to be activated being matched up with the current emotion, generate a switching signal that describes switching to the driving mode to be activated with the set of settings that is specific for the at least two motor vehicle systems described by the one of the at least two predetermined driving modes associated with the current driving context selected to be activated, and transmit the switching signal to the driving dynamics system facility for configuring the at least two motor vehicle systems, after configuration of the at least two motor vehicle systems, provide further driver monitoring data, determine whether a driving behavior described based on the further driver monitoring data fulfills a given acceptance criterion that specifies that the current emotion or a reaction of the driver described by the further driver monitor data, being an operating of the motor vehicle, is a given positive emotion or reaction, and when the driving behavior does not fulfill the given acceptance criterion: select a second one of the at least two predetermined driving modes associated with the current driving context using an emotion determined based on the further driver monitoring data and generate a second switching signal that describes switching to the second one of the at least two predetermined driving modes associated with the current driving context with the set of settings that is specific for the for at least two motor vehicle systems described by the second one of the at least two predetermined driving modes associated with the current driving context.

8. A motor vehicle comprising a control device according to claim 7.

* * * * *